Patented Nov. 28, 1944

2,363,646

UNITED STATES PATENT OFFICE 2,363,646

HIDE TREATMENT

Victor Conquest, Chicago, and Havard L. Keil, Clarendon Hills, Ill., assignors to Armour and Company, Chicago, Ill., a corporation of Illinois No Drawing. Application May 8, 1941, Serial No. 392,520

12 Claims. (Cl. 195—6)

This invention relates to the treatment of hides containing hair thereon and deals particularly with processes for recovering hair from hide materials. The invention is concerned also with the separate recovery of hair, fat and proteins from such hide materials.

There previously have been many processes for unhairing animal hides, and these processes involve the loosening of the hair so that it may be easily pulled from the hide. Also, there have been many methods known as "bating" processes for removing hair from hides. These bating processes have in mind the subsequent use of the hide as leather, or the like, and the hair is destroyed or is injuriously affected for any subsequent use, most generally such bating treatment has involved the use of strong alkalies which chemically affect the hair.

The process of the present invention is different from the unhairing or the bating processes above mentioned and involves the digestion or disintegration of the hide, thus to remove it in the form of a solution from the hair, the hair not being affected by the treatment. To effect such disintegration we employ a proteolytic enzyme such as papain, for example.

The hide may be subjected to the action of a vegetable enzyme in the presence of water, and by the digestion process the hide is disintegrated and held in the water. Then the solution containing the digested material is removed, to separate it from the hair. In this procedure the vegetable enzymes, such as papain, bromelin, and ficin, are effective, but we find the animal enzymes, such as pancreatin and pepsin, are not satisfactory due to the length of time for digestion to take place. It is important that the digestion be fully completed before objectionable decomposition or spoiling takes place. The animal enzymes are unsatisfactory also because of their objectionable effect on the hair.

Another procedure within the invention involves a conditioning treatment with proteolytic enzymes whereby the hides are conditioned for disintegration but are not wholly digested and brought into solution. This conditioning treatment is then followed by a heating step in which the undigested hide material is broken down and disintegrated so that it can be removed with the liquid.

A further advantage is gained in the use of our processes by recovering the protein materials from the liquid solution. These proteins are good starting materials for the manufacture of glue and other useful products. Advantageously, the solid substances recovered from the solution may be rendered to remove the fat therefrom, and the fat and proteins recovered as separate products.

As another feature of the invention we prefer first to treat the hide material with a suitable acid to reduce the pH to below 6.0 and preferably between a pH of 2 and 5 before the treatment with the enzyme. This pretreatment has proved particularly effective when the enzyme used is papain.

In our processes the hide materials are caused to disintegrate and be held in the liquid. In some respects the resulting liquid is a suspension of finely divided matter and in some respects a solution, but for clearness of understanding we will call this resulting liquid, throughout this description and in the appended claims, simply solution.

In practicing our invention any kind of animal hides may be used, and the hair recovered may be wool or other hair material derived from an animal source. The invention finds particular practical utility in connection with scraps of hides too small to be useful as leather or skins.

In carrying out the improved processes, a quantity of hides, such as sheep scrap hides, may be washed to remove the blood, dirt, etc., and placed in a vat with a suitable quantity of water. The amount of water may be, for example, about 2 to 4 times by weight of the hides being treated. To this we prefer to add an acid which may be muriatic acid, hydrochloric acid, or other acid not injurious to the hair or the enzyme. If desired, this acid water may be removed and the treatment repeated. The acid of the final bath should be sufficient to bring the pH preferably to between 2 and 5. To this mixture may be added a suitable quantity of vegetable proteolytic enzyme. The amount will depend upon the kind and proteolytic strength of the enzyme used, the amount of the hides being treated, etc. This mass is then heated and maintained at a temperature at which the enzyme is active, for a period such as 4 to 8 hours. When papain is used the temperature may be, for example, about 150° F. The liquid containing the digested material may then be poured from the vat and the hair separately recovered.

Usually, however, we prefer to heat treat the mixture after the holding period, during which the enzyme has acted. This step includes heating the mixture to above 160° F., and preferably between 170° F. and boiling temperature. When not all of the skin matter has been previously dispersed in the liquid, this heat treatment serves to disintegrate or break down the undigested material and bring it also into the liquid in dispersed form. In this case the initial enzyme treatment has served to condition the protein matter for heat breakdown, since without such conditioning treatment there would be no appreciable breakdown.

The heat necessary for this last mentioned step may be supplied by any suitable means and may be continued about one hour more or less. In some instances we find it advantageous to inject steam into the mass, maintaining a pressure of about 5 to 20 pounds per square inch.

When the hide is digested and held in the liquid, the liquid is withdrawn and utilized, for example, in making glue, or it may be evaporated to recover the solids contained in it. These solids consist largely of proteins in broken down form and fat. Advantageously, these solids may be rendered by heat in well known processes and the fat thus recovered separately.

Instead of, or in conjunction with the latter treatment step, we can subject the mixture to treatment with bacteria to remove any undigested proteinaceous material. Suitably, this may be accomplished by inoculating the mixture with an appropriate culture, and holding the mass at about 104° F. and about 20 or 24 hours to produce bacterial action sufficient to bring any remaining proteinaceous material into solution.

The hair, which may be wool, recovered as a result of the processes may be washed in hot water and scoured to prepare it for use in textiles, or for other purposes.

It is understood that the process of the invention may be practiced to good effect without the aid of any bacterial treatment and also may be practiced without pretreatment with acid, although the acid treatment greatly enhances the results obtained through the use of vegetable enzymes.

In some instances we find it advantageous to conduct the initial vegetable enzyme treatment at a relatively low temperature at which the enzyme is active such as about 104° F. Then after a period of time, such as 10 to 20 hours, the temperature may be raised to a temperature at which the enzyme is extremely active, such as about 150° F. until the hide is dissolved, this latter period being say about 2 or 3 hours. Then if not all the scurf of the hides is dissolved the mass may be brought to boiling temperature to complete the disintegration.

It will be understood that the time involved in conducting each step of the process will depend on the other factors involved such as the character of the raw material, the temperature employed, and other of the variable conditions encountered in the practice of the invention.

Another modified procedure which has been found quite advantageous in the recovery of wool from sheep hide, involves first a treatment of the hides in the usual way with a sulfur compound to loosen the hairs, the hairs being pulled loose from a large portion of the hide. Then the scraps and portions still containing hair are treated with a vegetable enzyme in the way set forth herein to dissolve the hide, thus recovering further quantities of hair. A peculiar advantage obtained by this procedure is due to the formation of hydrogen sulfide gas which acts as an activator for the vegetable enzyme. By the term "sulphur compound" we mean to designate sulphur or any of the sulphur substances heretofore employed for unhairing hides.

If desired, only sufficient sulfur compound need be used to activate the vegetable enzyme and to promote autolysis, and the combined action of the compound and the enzyme serves to digest the hide and free the hair. In this way we obtain the advantage of natural autolysis as well as the result of a very active enzyme.

Many variations of the processes herein set forth fall within the spirit of this invention, and we do not wish the invention to be limited by the specific conditions and circumstances given which have been for the purpose of explanation only.

The following specific examples set forth in detail various modes of practicing the invention. It is understood that these examples are for the purpose of explanation only and are not to be taken in a limiting sense.

*Example 1*

100 lbs. of fresh wool scrap are placed in about 3 volumes of water and 1% of muriatic acid (1 lb.) is added. There are also added 3.5 oz. of sodium sulfide. The whole is heated at 104° F. and then there is added 0.1 lb. of commercial papain. The mass is allowed to digest at this temperature for about 16 hours and is then heated at 150° F. for about 3 hours. At the end of this heating step the hide is dissolved. The mass is then brought to boiling temperature to dissolve the scurf, or fragments of epidermis, and the freed wool is removed from the top of the hot solution.

*Example 2*

100 lbs. of wool scrap are placed in about twice their volume of water containing 1 lb. of muriatic acid. There are then added about 0.25 lb. of sodium sulfide and 0.1 lb. papain, the whole is thoroughly stirred and allowed to stand at 104° F. for about 17 hours. The temperature is then increased to 160° F. and maintained at this point for 5 hours. The hide material is now in solution and the solution is drained away from the wool, which is then washed and scoured.

*Example 3*

To 100 lbs. of sheep hide scrap in a suitable vat are added 200 lbs. of water and 0.5 lb. of muriatic acid (24% HCl) and the whole is heated to 122° F. This water is then discarded and to the hide is added another 200 lbs. of water containing 1.5 lbs. of muriatic acid. This mixture is then heated to 122° F. and to it is added 0.1 lb. of papain, suitably suspended in about 1 quart of water. The mixture is stirred well and allowed to digest for about 2 hours, or until the temperature has decreased to about 104° F. The treated mass is then allowed to stand for about 24 hours to permit growth of bacteria which digest remaining epidermal material and "clean up" the wool. At this point, alternatively, the mass may be inoculated with a culture prepared by allowing a portion of an enzyme digest of hide material as described above to incubate for a time. The wool mass is now held for about 20 hours at 40° C. and at the end of this time is heated to 185° F., causing the hide material to go into solution. The liquid is drawn off and the wool is washed with hot water. The wool may afterward be scoured in the usual manner. The yield of wool amounts to about 10 lbs.

*Example 4*

1313 parts by weight of wet wool scrap are placed in 2 volumes of water and there are added 1.4 parts by weight of muriatic acid and 1.3 parts by weight of papain. The whole is stirred well and digested at 40° C. for an hour. Another ½ volume of water is added and the digested mixture is heated again to bring it into solution. The wool is drained off and washed and the yield was 147 parts by weight of dry wool.

We claim:

1. A process of treating hides containing hair thereon, comprising subjecting said hides to the action of a vegetable proteolytic enzyme in the presence of water to the extent of bringing the hide into solution in said water, and separating said solution from the hair.

2. A process for recovering a hair material from hides, comprising first treating the hides with a sulfur compound whereby a part of the hair is loosened, removing loosened hair, subjecting at least a portion of the hide to the digestive action of a vegetable proteolytic enzyme in the presence of water to bring it into solution in the water, and separating said solution containing digested hide from the remaining hair material.

3. A process of treating hides containing hair thereon, comprising subjecting said hides to the action of papain in the presence of water to the extent of bringing the hide into solution in said water, and separating said solution from the hair.

4. A process for recovering hair from hides containing the same, comprising treating said hides with acid to reduce their pH below 6.0, subjecting the acidified hides to the action of a vegetable proteolytic enzyme in the presence of water to digest the hide and bring it into solution, and separating the solution containing the digested hide from the hair.

5. A process for recovering hair from hides containing the same, comprising preparing a mixture including said hides and water, said mixture having a pH of from 2 to 5, subjecting the hides while in said aqueous bath to the action of a vegetable proteolytic enzyme, and when the hide has been digested and brought into solution separating the liquid solution from the hair.

6. A process for recovering hair from hides containing the same, comprising preparing a mixture including said hides and water, said mixture having a pH of from 2 to 5, subjecting the hides while in said aqueous bath to the action of papain, and when the hide has been digested and brought into solution separating the liquid solution from the hair.

7. A process for recovering hair from hides containing the same, comprising subjecting said hides to a preliminary treatment with a vegetable proteolytic enzyme in the presence of water at a temperature at which said enzyme is active, whereby a portion of said hide is digested and brought into solution in said water, and thereafter heating the undigested material to a temperature in excess of 160° F. to disintegrate and bring the remaining hide into solution, and separating the solution containing the digested material from the hair material.

8. A process for recovering hair from hides containing the same, comprising subjecting said hides to a preliminary treatment with a vegetable proteolytic enzyme in the presence of water at a temperature at which said enzyme is active, whereby a portion of said hide is digested and brought into solution in said water, and thereafter heating the undigested material to a temperature between 170° and boiling temperature to disintegrate and bring the remaining hide into solution, and separating the solution containing the digested material from the hair material.

9. A process for recovering hair from hides containing the same, comprising subjecting said hides to a treatment with a vegetable proteolytic enzyme in the presence of water and at a temperature at which said enzyme is active, whereby said hide is conditioned for disintegration upon the application of heat, and thereafter heating said conditioned material to a temperature of between 170° F. and boiling temperature under the conditions of the process, whereby said hide is disintegrated and brought into solution in said water, and separating said solution containing said disintegrated hide from the hair material.

10. A process for recovering hair from hides containing the same, comprising subjecting said hides to a treatment with a vegetable proteolytic enzyme in the presence of water and at a temperature at which said enzyme is active, whereby said hide is conditioned for disintegration, and thereafter heating said conditioned material with steam and under a pressure of from 5 to 20 pounds per square inch, whereby said hide is disintegrated and brought into solution in said water, and separating said solution containing said disintegrated hide from the hair material.

11. A process for recovering hair from hides containing the same, comprising subjecting said hides to a treatment with papain in the presence of water and at a temperature at which said enzyme is active, whereby said hide is conditioned for disintegration, and thereafter heating said conditioned material with steam and under a pressure of from 5 to 20 pounds per square inch, whereby said hide is disintegrated and brought into solution in said water, and separating said solution containing said disintegrated hide from the hair material.

12. A process for recovering hair material from hides, comprising subjecting the hides to the action of a vegetable proteolytic enzyme in the presence of water, whereby a major part of the hide is digested and brought into solution in said water, separating said solution containing the digested material from the hair material containing undigested hide portions, and thereafter subjecting said hair material containing undigested hide portions to fermentation, whereby the remaining hide portions are removed from the hair.

VICTOR CONQUEST.
HAVARD L. KEIL.